United States Patent
Smith et al.

(10) Patent No.: US 12,556,715 B2
(45) Date of Patent: Feb. 17, 2026

(54) DATA CODEC METHOD AND APPARATUS

(71) Applicant: Sony Interactive Entertainment Inc., Tokyo (JP)

(72) Inventors: Alexander Smith, London (GB); Michael Adam Kavallierou, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 597 days.

(21) Appl. No.: 18/058,307

(22) Filed: Nov. 23, 2022

(65) Prior Publication Data
US 2023/0164330 A1 May 25, 2023

(30) Foreign Application Priority Data
Nov. 24, 2021 (GB) ..................... 2116906

(51) Int. Cl.
*H04N 19/167* (2014.01)
*H04N 19/124* (2014.01)
*H04N 19/597* (2014.01)

(52) U.S. Cl.
CPC ......... *H04N 19/167* (2014.11); *H04N 19/124* (2014.11); *H04N 19/597* (2014.11)

(58) Field of Classification Search
None
See application file for complete search history.

(56) References Cited

U.S. PATENT DOCUMENTS 10,121,337 B2 * 11/2018 Yuan ..................... H04N 19/17
10,373,592 B2   8/2019 Tall
(Continued)

FOREIGN PATENT DOCUMENTS

EP    3392744 A1    10/2018
JP    2019533325 A  11/2019
(Continued)

OTHER PUBLICATIONS

Combined Search and Examination Report for corresponding GB Application No. 2116906.5, 11 pages, dated Sep. 12, 2022.
Emmanuel Thomas, et al, "Peripheral and center visions multi-stream scheme for foveated streaming—OMAF", ISO/IEC JTC1/SC29/WG11, 2017,URL: http://phenix.intevry.fr/mpeg/doc end user/documents/118 Hobart/wgii/m40599-vim40599-Peripheralandcentervisionmultistreamsforfoveatedstreamining.zip, 6 pages, Apr. 1, 2017 (For relevancy see Non-Pat. Lit. # 1).
(Continued)

*Primary Examiner* — Anand P Bhatnagar
(74) *Attorney, Agent, or Firm* — Kilpatrick Townsend & Stockton LLP

(57) ABSTRACT

A data encoding method includes identifying within an image at least a foveal zone and a peripheral zone, the foveal zone of the image being estimated to coincide with the fovea of a user's eye when viewed by the user, encoding for transmission the different zones of the image at different qualities, the encoding quality for the foveal zone being higher than for the peripheral zone, and transmitting the encoded image to a remote viewing device; meanwhile, a data decoding method includes receiving an encoded image, different portions of the encoded image having been encoded at different qualities according to whether they are in at least a foveal zone and a peripheral zone, the foveal zone of the image being estimated to coincide with the fovea of a user's eye when viewed by the user, and the encoding quality for the foveal zone being higher than for the peripheral zone, decoding the portions of the image according to a respective decoding scheme corresponding to the respective encoding of each portion of the image, and outputting the decoded image for display.

14 Claims, 3 Drawing Sheets

(56) References Cited

U.S. PATENT DOCUMENTS

| | | | |
|---|---|---|---|
| 10,684,685 B2 * | 6/2020 | Young | G06F 3/0304 |
| 11,164,339 B2 | 11/2021 | Krishnan | |
| 11,284,109 B2 * | 3/2022 | Hinds | H04N 19/132 |
| 11,287,884 B2 * | 3/2022 | Young | H04N 19/124 |
| 11,363,282 B1 * | 6/2022 | Christofferson | H04N 19/13 |
| 11,653,026 B2 * | 5/2023 | Chou | H04N 19/147 |
| | | | 375/240.19 |
| 11,736,716 B2 * | 8/2023 | Lin | H04N 21/4728 |
| | | | 375/240.16 |
| 11,836,289 B2 * | 12/2023 | Young | G06F 3/0304 |
| 12,003,760 B2 * | 6/2024 | Lin | G06F 3/017 |
| 12,052,440 B2 * | 7/2024 | Chou | H04N 19/18 |
| 12,158,587 B2 * | 12/2024 | Palacios | G02B 27/0093 |
| 12,250,385 B2 * | 3/2025 | Hansen | H04N 19/42 |
| 2005/0018911 A1 | 1/2005 | Deever | |
| 2017/0285736 A1 * | 10/2017 | Young | G06F 3/147 |
| 2018/0033405 A1 | 2/2018 | Tall | |
| 2021/0142520 A1 | 5/2021 | Krishnan | |

FOREIGN PATENT DOCUMENTS

| | | | |
|---|---|---|---|
| WO | 9833315 A2 | 7/1998 | |
| WO | 2018136301 A1 | 7/2018 | |
| WO | 2019092463 A1 | 5/2019 | |
| WO | WO-2021016176 A1 * | 1/2021 | H04N 23/957 |

OTHER PUBLICATIONS

Zou Wenjie et al, "Enhancing Quality of Experience for Cloud Virtual Reality Gaming: An Object Aware Video Encoding" IEEE International Conference on Multimedia & Expo Workshops, State Key Laboratory of Integrated Services Networks, China, 6 pages, Jan. 2021 (For relevancy see Non-Pat. Lit. # 1).

Examination Report for corresponding GB Application No. 2116906. 5, 7 pages, dated Sep. 25, 2024.

* cited by examiner

DATA CODEC METHOD AND APPARATUS

BACKGROUND OF THE INVENTION

Field of the Invention

The present invention relations to a data codec method and apparatus.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Head mounted displays 'HMDs' for virtual or augmented reality applications typically comprise two displays (one for each eye) receiving respective images at corresponding viewpoints, and typically do so at a high frame rate because responsive image updating can reduce a sense of nausea created by vestibular/image disparity.

As a result, the bandwidth of image data from the source to the HMD is particularly high, and this can impact on component requirements for the HMD, battery life, data connectivity options, and the like.

Accordingly, it would be desirable to send the image data in a manner that improved or maintained subjective image quality for the user for a comparatively lower bandwidth and/or computational load.

SUMMARY OF THE INVENTION

Various aspects and features of the present invention are defined in the appended claims and within the text of the accompanying description.

In a first aspect, a data encoding method is provided in accordance with claim 1.

In another aspect, a data decoding method is provided in accordance with claim 11.

In another aspect, an entertainment device is provided in accordance with claim 14.

In another aspect, a display device is provided in accordance with claim 14.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

A data compression method and apparatus are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figure 1:
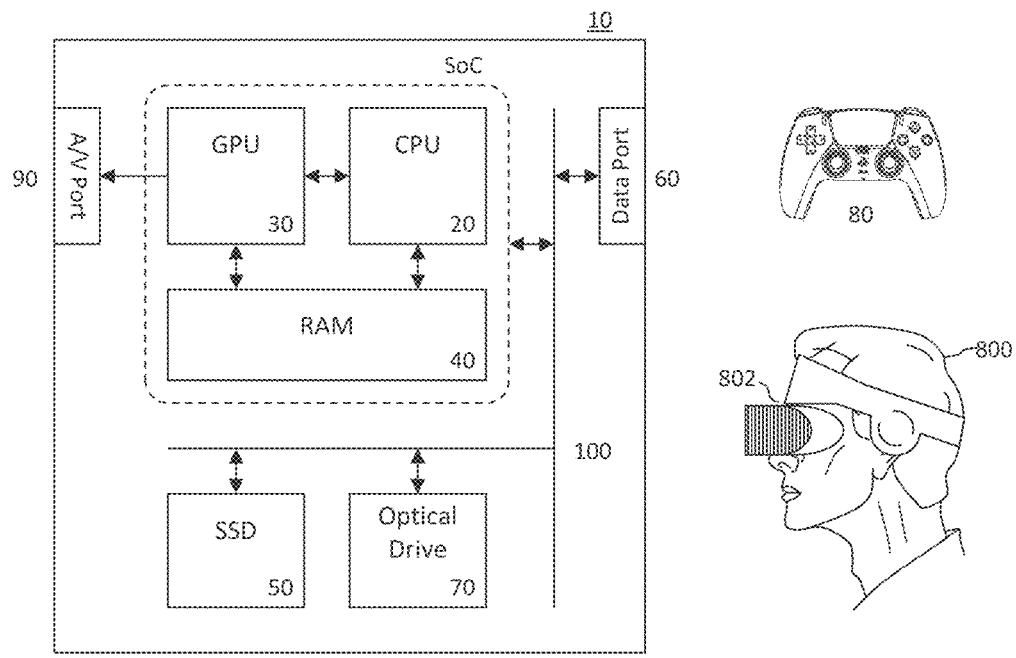
FIG. 1 is a schematic diagram of an entertainment device and display device in accordance with embodiments of the description.

Referring now to the drawings, wherein like reference numerals designate identical or corresponding parts throughout the several views, FIG. 1 shows and example of a data compression system 1, comprising an entertainment system 10 and a head mounted display 'HMD' 802.

An example of an entertainment system 10 is a computer or console such as the Sony® PlayStation 5® (PS5).

The entertainment system or device 10 comprises a central processor 20. This may be a single or multi core processor, for example comprising eight cores as in the PS5. The entertainment system also comprises a graphical processing unit or GPU 30. The GPU can be physically separate to the CPU, or integrated with the CPU as a system on a chip (SoC) as in the PS5.

The entertainment device also comprises RAM 40, and may either have separate RAM for each of the CPU and GPU, or shared RAM as in the PS5. The or each RAM can be physically separate, or integrated as part of an SoC as in the PS5. Further storage is provided by a disk 50, either as an external or internal hard drive, or as an external solid state drive, or an internal solid state drive as in the PS5.

The entertainment device may transmit or receive data via one or more data ports 60, such as a USB port, Ethernet® port, WiFi® port, Bluetooth® port or similar, as appropriate. It may also optionally receive data via an optical drive 70.

Interaction with the system is typically provided using one or more handheld controllers 80, such as the DualSense® controller in the case of the PS5.

Audio/visual outputs from the entertainment device are typically provided through one or more A/V ports 90, or through one or more of the wired or wireless data ports 60.

Where components are not integrated, they may be connected as appropriate either by a dedicated data link or via a bus 100.

An example of a device for displaying images output by the entertainment system is a head mounted display 'HMD' 802, worn by a user 800.

Typically such an HMD comprises two displays (one for each eye), and may also receive images at a high frame rate (for example at 120 or 100 Hz, or at 60 or 50 Hz with local frame interpolation and/or so-called reprojection).

In any event, the combination of two images and a high frame rate means that a data high bandwidth is typically required to transmit the image information from the entertainment device to the HMD.

This impacts the computational and I/O resources of the entertainment device generating the data and encoding/packaging it for transmission, and also the HMD receiving and depackaging/decoding it for display—both in terms of computational load and also, in the case of a wireless HMD, in terms of battery life. Finally, such a bandwidth imposes requirements on the wired or wireless connection between the entertainment device and the HMD, or conversely the wired or wireless connection imposes an upper limit on bandwidth that can impact the resolution, frame rate, or other aspect of the images that are transmitted.

It would be beneficial to encode and transmit the image data in a manner that reduced computational resource in at least one part of the system, and improved or maintained subjective image quality for the user for a comparatively lower bandwidth and/or computational load.

Accordingly, embodiments of the description comprise a data compression scheme based on foveated rendering.

Figure 2:
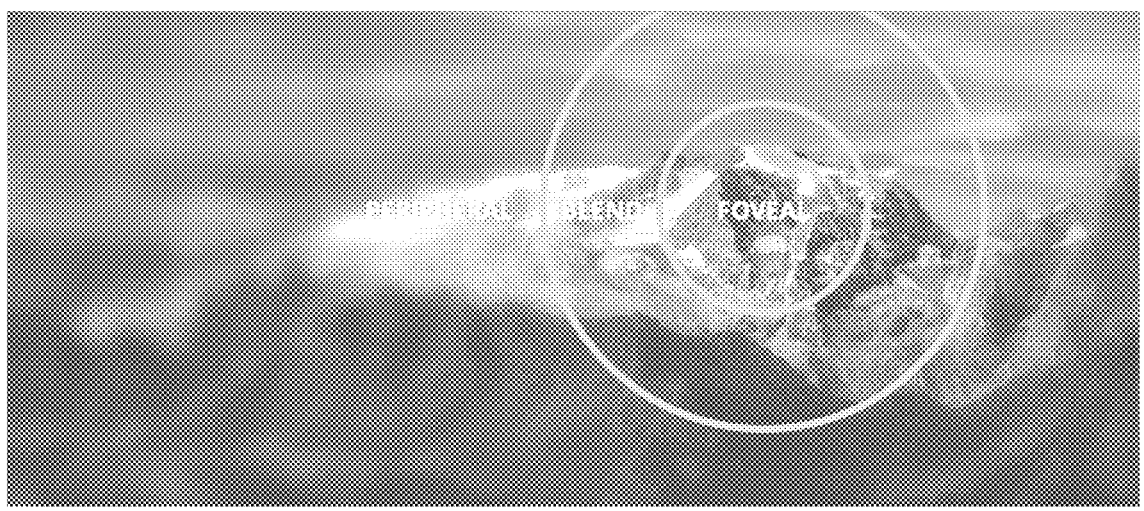
FIG. 2 is a schematic diagram of an image rendered using foveated rendering in accordance with embodiments of the description.

Referring to FIG. 2, foveated rendering typically creates two or three zones (three are shown in FIG. 2), and rendering is performed at different quality levels dependant on the zone. Due to how humans view the world the area at the focal point or fovea position is viewed most clearly, and typically there can be a 'blended' or intermediate periphery with less detail whilst even further out in the periphery area the image is pixelated or blurred even further.

Hence based on where the assumed or measured (i.e. estimated) position of where in the image will coincide with the fovea when viewed by the user, the foveal zone can be centred on this position, with a peripheral region surrounding it, and optionally one or more intermediate zones in between. The size of the foveal zone can be based on the expected area of the image to be viewed within the user's fovea. For an HMD where the image size and distance from the user's eye is known, this can be estimated quite accurately. For other viewing scenarios, such as on a TV, the size of the TV and the distance of the user from it may need to be input, estimated or measured.

The foveal zone may, by default, be slightly larger than the expected area of the image to be viewed within the user's fovea (e.g. by 10 or 25% as non-limiting examples), to encompass natural variation in user fovea sizes and also to reduce the chance of any transition from the foveal zone to the next zone being noticeable to the user.

The net effect of this rendering approach is that the VR experience is perceived as being fully clearly rendered by the user.

The foveated rendering can select the foveal area using one or several schemes; static foveated rendering simply places the foveal zone in the centre of the image, assuming that this is where the user is looking. Object tracked foveated rendering places the foveal zone coincident with a displayed object of interest, typically tagged as such within the game/application (for example the location of the user's avatar, or the location of a targeting reticule, or a new non player character, or scripted event, or the like), again on the assumption that this is where the user is looking. Meanwhile, gaze tracked foveated rendering places the foveal zone coincident with a position in the image the calculated to project on the fovea of the user, based on where they are currently looking. This latter approach gives the best subjective experience to a user, but assumes a gaze tracking capability (for example using a camera to track eye direction).

In practice the different in quality between zones may arise from a variety of different approaches that benefit different aspects of the system; for example using lower quality textures and meshes in the peripheral and optionally blended zones reduce computational overhead when generating the virtual environment. Meanwhile using lower resolutions (for example by rendering one in two pixels in the blended zone, and one in four in the peripheral zone, and then cloning or interpolating for the missing pixels) reduces computational overhead during the rendering phase.

Both of these may be beneficial for example to reduce battery drain for a portable device, and/or improve frame rate (which is typically considered prima facie desirable, and for HMDs and virtual reality applications, a higher frame rate is typically associated with reduced incidence of nausea due to the images being more rapidly responsive to changes in viewpoint).

The present description appreciates that these differences in quality between zones can also assist with the transmission of the resulting rendered image to the HMD.

Generally, the inherent quality of the coding scheme for each zone varies according to the zone, which the highest quality in the foveal zone and the lowest in the peripheral zone. Any intermediate zones (e.g. one or more blended zones) have a correspondingly intermediate quality.

The variation in quality provides a corresponding variation in bandwidth, with high quality encoding using more bandwidth than lower quality encoding, and vice-versa.

Sources of variations in quality include but are not limited to:

Bit depth for colour representation (more bits for higher quality)

Encoded pixel density (e.g. encode more or all pixels at high quality, and fewer e.g. 3/4, 2/4, 1/4 at lower qualities, relying on cloning or interpolation at the receiver to back-fill)

in other words, varying encoding resolution (optionally in conjunction with rendering resolution).

Quantisation (mapping source values to more quantised values for higher quality, and fewer quantised values for lower quality)

Variations in lossy encoding (for example dropping higher frequency information in frequency domain encodings such as JPEG or MPEG types to reduce quality).

Variations in interpolation/sampling processes (for example using more interpolation and/or less sampling for lower quality).

Interpolating data between a stereoscopic image pair or sampling from complementary pixels of such an image pair for lower quality encoding.

Generating fewer or no enhancement layers during encoding in a subsequent zone (e.g. using a low quality encoding base layer for low quality encoding, and then one or more additional enhancement layers for successively better quality encoding).

Altering the frame rate to transmit fewer images, for example relying on interframe interpolation to maintain a frame rate at the display.

Clearly some approaches may complement approaches already used during image generation—hence for example if the blended zone renders 2 in 4 pixels, and the peripheral zone renders 1 in 4 pixels, then only the rendered pixels may be encoded (optionally using other variations in quality as well). Similarly if lower quality textures have been used in the blended or peripheral zone, having less detail, then an encoding scheme that can reduce bandwidth by reducing high frequency detail may complement this approach.

It will also be appreciated that whilst a single encoding scheme may be used for the whole image, but with different variations in quality in different zones based on differences in settings and parameters (e.g. one encoder using different settings), optionally one or more zones may be encoded using completely different schemes having different quality and bandwidth properties (e.g. different encoders).

For example, the foveal zone may be encoded using a lossless scheme, whilst the blended and peripheral zones are encoded using one or more lossy schemes.

Hence in general, by using a different type of encoding, and/or different settings within a type of encoding, a different quality and associated bandwidth of encoded image may be generated for the different zones of the image, including at least the foveal zone and peripheral zone, and optionally one or more intermediate or 'blended' zones.

Figure 3:
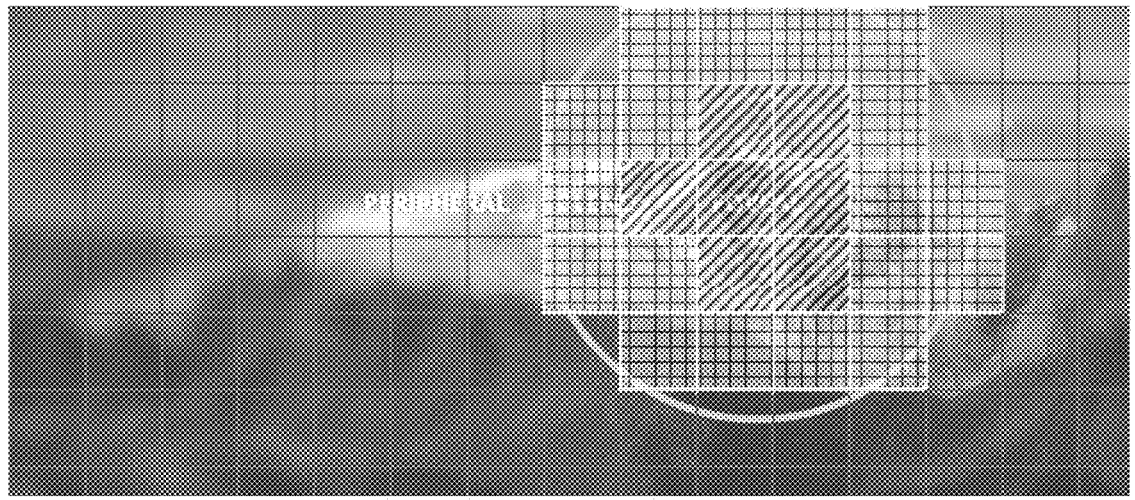
FIG. 3 is a schematic diagram of an image indicating different encoding schemes for different portions of the image in accordance with embodiments of the description.

Referring now to FIG. 3, an image may be encoded as a series of tiles (denoted by the large grid superposed on the background image of a mountain). A tile may correspond to a so-called macro block, or a set of such blocks (e.g. 2×2 or 4×4), or may correspond to encoding blocks of varying size (if supported by the relevant encoding scheme), or may represent a region of the image of any size supported by the relevant encoding scheme. Tiles of different sizes may be used, for example with large tiles encoding regions wholly within a particular zone and smaller tiles encoding regions bounding two zones, so that either less of a lower quality zone is encoded using a higher quality scheme, or less of a higher quality zone is encoded using a lower quality scheme.

The zones themselves may be concentric circles as illustrated in the figures, or may be shapes that conform to the chosen tiling scheme, or may follow the contours or edges of regions of interest for example in an object tracked foveated scheme).

Each tile may then be encoded according to an appropriate encoding scheme.

Hence for example tiles in the foveal zone (indicated in FIG. 3 by diagonal hatching) may be encoded with the highest quality scheme, whilst tiles in the intermediate or blended zone (indicated in FIG. 3 by horizontal and vertical hatching) may be encoded with an intermediate quality scheme, and the tiles in the peripheral zone (indicated with no hatching) may be encoded with a lower quality scheme.

In this way, the overall bandwidth associated with the encoding of the image may be reduced, whilst limiting the subjective impact of the mixed quality encoding by maintaining the highest quality in the region of the image most likely to be looked at by the user.

Optionally, the resulting transmitted image information may be subject to a bandwidth budget cap, Such that in normal operation the bandwidth for a given image or stereoscopic image pair should not exceed a certain amount (although this amount may vary from image to image depending on what other information is being transmitted within an overall bandwidth capability).

Accordingly, it may be that for a given series of different quality encoding schemes, successive images occupy more or less of the available bandwidth budget (for example, images with less variation in colour, or fewer high-frequency components, may require less bandwidth to encode).

In this case, optionally the quality of encoding may be selectively increased for an image, optionally until a subsequent increase would exceed the budget.

This increase may be implemented on a tile by tile basis for example according to one or more of the following rules.

i. Modify boundary rules for tiles so that the threshold occupancy of a higher quality zone within a tile required to count that tile as being in the higher quality zone is reduced.

Hence for example if the current rule is that more than (as a nonlimiting example) 50% of a tile has to be within the foveal zone to be encoded according to the high quality scheme used for the foveal zone, then this rule may be changed to 25%, 10%, 5% or 1%. This will have the effect of increasing the size of the foveal zone, as quantised into tiles, and hence increase the proportion of the image encoded using the highest quality scheme. This will increase the overall bandwidth but improves image quality in the area most likely to be noticed by the user. The choice of the initial % threshold may be a designer choice. Whether to successively step through such lower thresholds or simply switch to a second, lower threshold (e.g. 10%) again may be a designer choice.

This approach may be implemented first for the foveal zone, and secondly for successive intermediate or blended zones. In this way, the quality of encoding expands or ripples out through the image as the effective size of successive quality zones increases, until a further increase would exceed the bandwidth budget.

ii. Modify boundaries to increase the size of one of the foveal zone and optionally an intermediate/blended zone.

This may be as simple as increasing the radius of a circular zone.

However alternatively it may involve adding regions to currently outside zone for example corresponding to an object of interest such as a targeting reticule, user avatar, scripted event or non-player character (for example a non-player character currently speaking or aiming a weapon at the user), or the centre of the image (for example, there is a tendency for eyes to at least partially revert to a central direction during a blink, and so the centre of the image may represent a hedge position for the possible direction of view when the user opens their eyes after blinking).

Typically this will involve successively adding tiles to the existing zone in order to encompass the object of interest and/or centre of the image. Alternatively, it involves adding tiles to initially encompass the object of interest and/or centre of the image, and then successively reaching back to the existing zone; this approach may result in non-contiguous zones, but encompasses the object of interest and/or centre of the image first in case successively adding tiles to link back to the zone exceeds the bandwidth budget.

iii. Modify encoding quality.

If the encoding quality of the foveal zone can be improved (for example using any of the sources of the variation described herein), then optionally this can be done whilst within the bandwidth budget. This can be achieve either by changing settings for a current encoding scheme or by changing to a better quality encoding scheme, as noted elsewhere herein.

Similarly if encoding quality of the intermediate/blended zone can be improved, then optionally this can be done whilst within the bandwidth budget.

It may be that the improvement in subjective image quality per encoded bit is greater for an improvement to the encoding quality of the intermediate zone than for improvement to the encoding quality of the foveal zone (in other words, if there are diminishing returns on encoded bits as encoding quality approaches maximum), in which case optionally the encoding quality of the intermediate zone is increased before that of the foveal zone, for example according to a bandwidth cost/image quality comparison curve.

Figure 4:
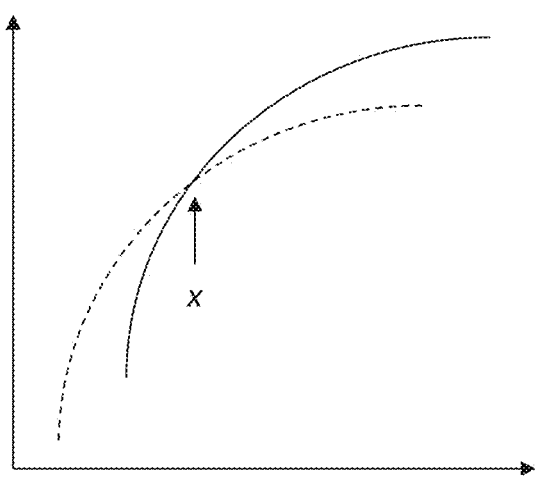
FIG. 4 is a schematic diagram depicting a bandwidth vs quality curves for different parts on an image in accordance with embodiments of the description.

Hence for example referring to FIG. 4, this illustrates bandwidth cost on the x-axis and subjective quality on the y-axis, with a dashed curve representing the foveal zone offset from a solid curve representing the intermediate zone, to bias the comparison in favour of the foveal zone. It will be appreciated that here the curves are the same on the assumption that the same overall encoding scheme is being used, but may differ if different encoding schemes are used between zones. In any event, here it can be seen that up until the point 'x', the system may improve the encoding quality of the foveal zone and obtain good subjective improvement, but as the rate of return of quality reduces with bits for the foveal zone, improving the encoding quality of the intermediate zone becomes the better option.

The bias between the zones may be a designer choice in any such decision process.

Using such techniques, the encoding quality of one or more zones may be incrementally improved until further improvement would exceed the bandwidth budget.

Conversely, if the default arrangement for encoding zones already exceeds a bandwidth budget, then encoding quality can be reduced, typically starting with the peripheral region. Optionally the encoding quality can be reduced only down to a predetermined minimum quality. If the scheme reaches its minimum quality and still exceeds the bandwidth budget, then the encoding quality of the next zone (e.g. the or a first intermediate zone) may start reduced, optionally down to a predetermined minimum quality for that zone, which may be higher than the predetermined minimum quality for the peripheral region, and so on all the way up to the foveal zone, until the encoded image meets the bandwidth budget.

It will be appreciated that incrementally adjusting tiles to meet a bandwidth budget may take time; to improve the speed of the process, typical changes in bit cost for changes in encoding can be predetermined; for example if a tile encoded using scheme X currently costs P bits, this is informative about the nature of the image information in that tile, and a relatively robust prediction can be made that encoding using scheme Y will cost Q bits, based on previous empirical measurements encoding images according to the various schemes available to the system. Hence a lookup table of different bit costs for encoding schemes (indicative of different input image data for a respective tile), repeated for different encoding schemes, allow for a prediction of the bit cost when changing scheme for the current tile based on the current cost for the current scheme.

In this way, a modification to the default encoding scheme can be quickly made, and a trial encoding performed; typically this trial encoding will result in an overall bit cost close to the predicted bit cost. If it is slightly over budget, then tiles whose coding has been improved can be selectively reverted to the lower quality encoding schemes in a reverse order to the enhancements described above, and conversely if the resulting cost is below budget, then encoding for additional tiles can be improved. This reduces the number of cycles of additional encoding required for the image.

Similarly, it can be generally assumed that the current image is visually similar to the previously encoded image, and so optionally the choice of encoding quality used for the previous image may be transposed to the current image. A trial encoding may then be performed, and again tiles may either have their encoding quality reduced or enhanced based on the above schemes according to whether or not the resulting image is above or under the bandwidth budget.

Hence using one or more of these schemes, the encoding quality of an image may be improved until further improvement would exceed the bandwidth budget for the image, and this improvement is implemented generally in the order of fovea, then intermediate/blended (if present), then peripheral, optionally with changes in this priority depending on whether there is a diminishing return on subjective quality for additional encoded bits for a higher quality region than a lower quality region such that it would be more beneficial to improve the quality of the lower quality region.

When transmitting the image, meta data indicating which regions of the image correspond. to which zone is also transmitted. This may take the form of a binary mask in the case of a two level foveated encoding scheme (e.g. including just fovea and peripheral regions), or a two-bit mask for three or four level foveated schemes (e.g. comprising a fovea region, one or two intermediate regions, and a peripheral region), and so on.

If the encoding scheme for each zone is fixed, then it may not be necessary to indicate which encoding scheme has been used in each zone.

If variations within an encoding scheme have are used from image to image, the meta data describing the variation (e.g. a variation from a default) may be included. Optionally this information may only be provided when variations occur; hence where a succession of images (perhaps by virtue of being similar) all prompt the same variation in encoding scheme to meet the bandwidth budget, then this variation may be indicated with the first such image, but not subsequently, with a new variation (including where this reverts to the default) only being conveyed with the next image to use it.

If the choice of encoding scheme varies for a given zone from image to image, then this may be conveyed in a similar manner, together with any variation from a default.

To reduce the amount of meta data required to convey information about variations of encoding scheme or choice of encoding scheme, a predetermined set of variations and encoding schemes may be chosen, for example 16, 32, 64, 128, 256 schemes and variants within them.

The appropriate choice may be conveyed on a per tile basis (for example if optionally there is variation within a zone (for example with incremental reductions in quality as a function of distance from the foveal region optionally within the blended zone or particularly the peripheral zone), or on a per zone basis, in which case it will be appreciated that only two, three, four, or a similarly small number of choices need to be conveyed per image, and may be part of the meta data used to convey the bitmap of tile types.

Alternatively, it may be self-evident from the encoded data for a given tile what encoding scheme has been used, obviating the need for such meta data. However, analysing tiles to determine the encoding scheme may place compositional burden on the receiving device, and so the meta data described above may simplify the decoding process even if the encoding type could be determined from the tile.

In addition to image encoding, optionally audio encoding may be subject to similar selective differences in encoding quality.

For example some sound sources may be encoded lost thusly, whilst others are subject to loss the compression. Examples may be that dialogue are encoded lost thusly whilst ambient sounds are encoded using a lossy scheme; alternatively or in addition, sounds associated with objects depicted in the foveal zone may be encoded using a higher quality scheme than sounds associated with objects in the intermediate zone or peripheral zone. Meanwhile optionally some sounds are not subject to such a scheme, such as for example a musical score, which may be encoded using a predetermined encoding scheme.

It will be appreciated that the bandwidth used by the audio represents an overhead within the overall bandwidth budget, and so variations in bandwidth may result in variations in the effective bandwidth budget for the images, or vice versa.

The encoded image information may then be transmitted to the receiving device, such as an HMD, optionally in conjunction with encoded audio information (alternatively this may have a separate channel with its own bandwidth budget).

Optionally, the encoded image information is transmitted in the order of meta data necessary to determine the type of tile encoding as described elsewhere herein, then tile data for the foveal zone followed by data for the or each intermediate zone, and finally tile data for the peripheral zone.

The receiving device receives the image data, and determines what encoding selection was made for each tile, either by assessing the encoded data in the tile, or typically by reference to meta data indicating what zone a tile is in and meta data indicating the encoding selection for each zone, alternatively meta data indicating the encoding selection for each tile.

The receiving device may then decode each tile according to the decoding scheme corresponding to the encoding selection for that tile.

Optionally the receiving device may decode tiles on a per zone basis, decoding tiles within the foveal zone first, then tiles within the or each intermediate zone, and finally decoding tiles within the peripheral zone.

Optionally decoded tiles may be displayed as they are decoded, replacing currently displayed tiles (or similarly zones may be displayed as they are decoded). This results in the foveated zone being updated in the display as quickly as possible. In conjunction with encoding the image information with the foveal zone tiles being the first tiles whose data is transmitted in the image data, this further improves the responsiveness of the image in the region that is likely to be viewed by the user, thus again improving subjective quality.

The above description assumes that the source image has been rendered using foveated rendering, but it will be appreciated that this is not essential to subsequent foveated encoding of the generated image.

Figure 5:
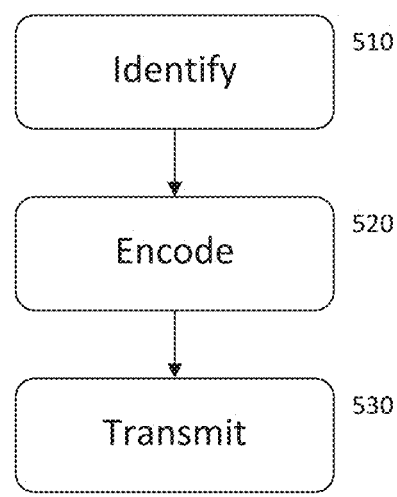
FIG. 5 is a flow diagram of a data encoding method in accordance with embodiments of the description.

Turning now to FIG. 5, in a summary embodiment of the present description a data encoding method comprises the following steps.

In a first step 510, identifying within an image at least a foveal zone and a peripheral zone, the foveal zone of the image being estimated to coincide with the fovea of a user's eye when viewed by the user, as described elsewhere herein.

In a second step 520, encoding for transmission the different zones of the image at different qualities, the encoding quality for the foveal zone being higher than for the peripheral zone, as described elsewhere herein.

And in a third step s530, transmitting the encoded image to a remote viewing device (such as an HMD), as described elsewhere herein.

It will be apparent to a person skilled in the art that variations in the above method corresponding to operation of the various embodiments of the apparatus as described and claimed herein are considered within the scope of the present invention, including but not limited to that:

In an instance of the summary embodiment, the image further comprises at least a first intermediate zone between the foveal zone and the peripheral zone, and the encoding quality for the or each intermediate zone is in between the encoding quality for the foveal zone and the encoding quality for the peripheral zone, as described elsewhere herein;

In an instance of the summary embodiment, the encoding quality is reduced between the foveal zone and subsequent zones by one or more selected from the list consisting of reducing a bit depth for colour representation of the image in a subsequent zone, encoding only a lower resolution using a subset of image pixels in a subsequent zone, reducing quantisation during encoding in a subsequent zone, reducing high frequency information encoded during encoding in a subsequent zone, generating fewer or no enhancement layers during encoding in a subsequent zone, and encoding each of a stereoscopic image pair using information from both images during encoding in a subsequent zone, as described elsewhere herein;

In an instance of the summary embodiment, the encoding quality is reduced between the foveal zone and subsequent zones by using a different, lower quality encoding scheme, as described elsewhere herein;

In an instance of the summary embodiment, the image is divided into tiles, and the encoding step comprises encoding tiles within the different zones at the different qualities, as described elsewhere herein;

In an instance of the summary embodiment, the encoded image is subject to a bandwidth limit, and the method comprises the steps of estimating the bandwidth cost of currently selected encodings for the image, and if the bandwidth cost is less than the bandwidth limit, improving the encoding quality of the image for at least one zone within the bandwidth limit, as described elsewhere herein;

In this instance, optionally the step of improving the encoding quality of the image for at least one zone comprises one or more selected from the list consisting of modifying tile inclusion rules for image tiles so that a threshold occupancy of a higher quality zone within a tile required to count that tile as being in the higher quality zone is reduced, increasing the size of at least the foveal zone, and increasing an encoding quality of at least the foveal zone, as described elsewhere herein;

In this instance, similarly optionally the step of improving the encoding quality of the image comprises estimating the change in bandwidth cost of candidate improved quality encodings for one or more portions (e.g. zones or tiles) of the image, prior to encoding said portions with the improved quality encodings, as described elsewhere herein;

In an instance of the summary embodiment, the encodings used for respective zones of an immediately preceding image are selected as the current encodings for the current image, as described elsewhere herein; and In an instance of the summary embodiment, the method comprises the step of encoding audio of at least one contributing sound with a quality dependent on which zone the associated sound source is depicted in, as described elsewhere herein.

Figure 6:
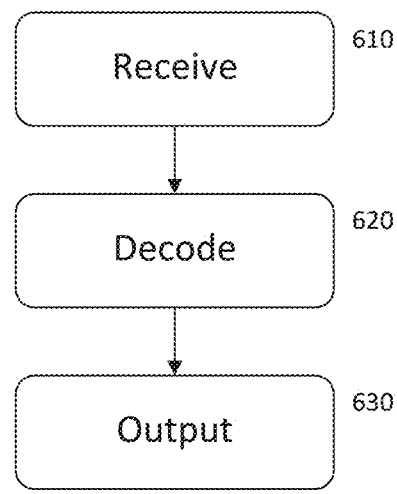
FIG. 6 is a flow diagram of a data decoding method in accordance with embodiments of the description.

Turning now to FIG. 6, in another summary embodiment, a data decoding method comprises the following steps.

In a first step 610, receiving an encoded image, different portions (e.g. zones or tiles) of the encoded image having been encoded at different qualities according to whether they are in at least a foveal zone and a peripheral zone, the foveal zone of the image being estimated to coincide with the fovea of a user's eye when viewed by the user, and the encoding quality for the foveal zone being higher than for the peripheral zone, as described elsewhere herein.

In a second step 620, decoding the portions of the image according to a respective decoding scheme corresponding to the respective encoding of each portion of the image, as described elsewhere herein.

And in a third step 630, outputting the decoded image for display, as described elsewhere herein.

It will be apparent to a person skilled in the art that variations in the above method corresponding to operation of the various embodiments of the apparatus as described and claimed herein are considered within the scope of the present invention, including but not limited to that:

the step of receiving an encoded image comprises receiving metadata indicating which tiles of a tiled image belong in which zone, as described elsewhere herein; and the step of receiving an encoded image comprises receiving metadata indicating which encoding scheme was used for which zone (or which tile), as described elsewhere herein.

It will be appreciated that the above encoding and decoding methods may be carried out on conventional hardware (such as entertainment system 10) suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

Accordingly, in a summary embodiment of the present description, an entertainment device 10 (such as the Sony® PlayStation 5®) comprises a data encoder, comprising in turn the following.

A zone identification processor (for example CPU 20) adapted (for example by suitable software instruction) to identify within an image at least a foveal zone and a peripheral zone, the foveal zone of the image being estimated to coincide with the fovea of a user's eye when viewed by the user, as described elsewhere herein.

An encoding processor (for example CPU 20) adapted (for example by suitable software instruction) to encode for transmission the different zones of the image at different qualities, the encoding quality for the foveal zone being higher than for the peripheral zone, as described elsewhere herein.

And, a transmitter (e.g. CPU 20 in conjunction with the data port 60) adapted to transmit the encoded image to a remote viewing device, as described elsewhere herein.

It will be appreciated that instances of this summary embodiment may implement the encoding methods and techniques described herein.

Similarly accordingly, in another summary embodiment a display device (such as for example HMD 802) comprises a data decoder comprising in turn the following.

A receiver (not shown) adapted (for example by suitable software instruction) to receive an encoded image, different portions of the encoded image having been encoded at different qualities according to whether they are in at least a foveal zone and a peripheral zone, the foveal zone of the image being estimated to coincide with the fovea of a user's eye when viewed by the user, and the encoding quality for the foveal zone being higher than for the peripheral zone, as described elsewhere herein.

A decoding processor (not shown) adapted (for example by suitable software instruction) to decode the portions of the image according to respective decoding schemes corresponding to respective encoding schemes of each portion of the image, as described elsewhere herein.

And a graphics processor (not shown) adapted (for example by suitable software instruction) to output the decoded image for display.

Again it will be appreciated that instances of this summary embodiment may implement the decoding methods and techniques described herein.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A data encoding method comprising the steps of:
identifying within an image at least a foveal zone and a peripheral zone, the foveal zone of the image being estimated to coincide with the fovea of a user's eye when viewed by the user;
encoding for transmission the different zones of the image at different qualities, the encoding quality for the foveal zone being higher than for the peripheral zone; and
transmitting the encoded image to a remote viewing device,
wherein the encoding quality is reduced between the foveal zone and the peripheral zone by one or more of:
i. reducing a bit depth for color representation of the image in a subsequent zone,
ii. encoding only a lower resolution using a subset of image pixels in a subsequent zone,
iii. reducing quantization during encoding in a subsequent zone,
iv. reducing high frequency information encoded during encoding in a subsequent zone,
v. generating fewer or no enhancement layers during encoding in a subsequent zone, or
vi. encoding each of a stereoscopic image pair using information from both images during encoding in a subsequent zone.

2. The data encoding method of claim 1 in which the image further comprises at least a first intermediate zone between the foveal zone and the peripheral zone, and the encoding quality for the or each intermediate zone is in between the encoding quality for the foveal zone and the encoding quality for the peripheral zone.

3. The data encoding method of claim 1 in which the encoding quality is reduced between the foveal zone and subsequent zones by using a different, lower quality encoding scheme.

4. The data encoding method of claim 1 in which the image is divided into tiles, and the encoding step comprises encoding tiles within the different zones at the different qualities.

5. The data encoding method of claim 1 in which the encoded image is subject to a bandwidth limit, the method comprising the steps of:
estimating the bandwidth cost of currently selected encodings for the image; and
if the bandwidth cost is less than the bandwidth limit, improving the encoding quality of the image for at least one zone within the bandwidth limit.

6. The data encoding method of claim 5, in which the step of improving the encoding quality of the image for at least one zone comprises one or more of:
   i. modifying tile inclusion rules for image tiles so that a threshold occupancy of a higher quality zone within a tile required to count that tile as being in the higher quality zone is reduced;
   ii. increasing the size of at least the foveal zone; and iii. increasing an encoding quality of at least the foveal zone.

7. The data encoding method of claim 5, in which the step of improving the encoding quality of the image comprises estimating the change in bandwidth cost of candidate improved quality encodings for one or more portions of the image, prior to encoding said portions with the improved quality encodings.

8. The data encoding method of claim 1, in which the encodings used for respective zones of an immediately preceding image are selected as the current encodings for the current image.

9. The data encoding method of claim 1, comprising the step of: encoding audio of at least one contributing sound with a quality dependent on which zone the associated sound source is depicted in.

10. A data decoding method, comprising the steps of:
   receiving an encoded image, different portions of the encoded image having been encoded at different qualities according to whether they are in at least a foveal zone, a peripheral zone, and an intermediate zone between the foveal zone and the peripheral zone, the foveal zone of the image being estimated to coincide with the fovea of a user's eye when viewed by the user, and the encoding quality for the foveal zone being higher than for the peripheral zone and the intermediate zone, and the encoding quality for the intermediate zone being higher than for the peripheral zone;
   decoding the portions of the image according to a respective decoding scheme corresponding to the respective encoding of each portion of the image; and
   outputting the decoded image for display.

11. A data decoding method according to claim 10, in which the step of receiving an encoded image comprises receiving metadata indicating which tiles of a tiled image belong in which zone.

12. A non-transitory, computer readable storage medium containing a computer program comprising computer executable instructions adapted to cause a computer system to perform a data encoding method, comprising:
   identifying within an image at least a foveal zone and a peripheral zone, the foveal zone of the image being estimated to coincide with the fovea of a user's eye when viewed by the user;
   encoding for transmission the different zones of the image at different qualities, the encoding quality for the foveal zone being higher than for the peripheral zone; and
   transmitting the encoded image to a remote viewing device,
   wherein the encoding quality is reduced between the foveal zone and the peripheral zone by one or more of:
   i. reducing a bit depth for color representation of the image in a subsequent zone,
   ii. encoding only a lower resolution using a subset of image pixels in a subsequent zone,
   iii. reducing quantization during encoding in a subsequent zone,
   iv. reducing high frequency information encoded during encoding in a subsequent zone,
   v. generating fewer or no enhancement layers during encoding in a subsequent zone, or
   vi. encoding each of a stereoscopic image pair using information from both images during encoding in a subsequent zone.

13. An entertainment device comprising:
   a data encoder comprising in turn: a zone identification processor adapted to identify within an image at least a foveal zone and a peripheral zone, the foveal zone of the image being estimated to coincide with the fovea of a user's eye when viewed by the user;
   an encoding processor adapted to encode for transmission the different zones of the image at different qualities, the encoding quality for the foveal zone being higher than for the peripheral zone; and
   a transmitter adapted to transmit the encoded image to a remote viewing device,
   wherein the encoding quality is reduced between the foveal zone and the peripheral zone by one or more of:
   i. reducing a bit depth for color representation of the image in a subsequent zone,
   ii. encoding only a lower resolution using a subset of image pixels in a subsequent zone,
   iii. reducing quantization during encoding in a subsequent zone,
   iv. reducing high frequency information encoded during encoding in a subsequent zone,
   v. generating fewer or no enhancement layers during encoding in a subsequent zone, or
   vi. encoding each of a stereoscopic image pair using information from both images during encoding in a subsequent zone.

14. A display device comprising:
   a data decoder comprising in turn: a receiver adapted to receive an encoded image, different portions of the encoded image having been encoded at different qualities according to whether they are in at least a foveal zone, a peripheral zone, and an intermediate zone between the foveal zone and the peripheral zone, the foveal zone of the image being estimated to coincide with the fovea of a user's eye when viewed by the user, and the encoding quality for the foveal zone being higher than for the peripheral zone and the intermediate zone, and the encoding quality for the intermediate zone being higher than for the peripheral zone;
   a decoding processor adapted to decode the portions of the image according to respective decoding schemes corresponding to respective encoding schemes of each portion of the image; and
   a graphics processor adapted to output the decoded image for display.

* * * * *